US007711772B2

(12) United States Patent
Brown et al.

(10) Patent No.: US 7,711,772 B2
(45) Date of Patent: May 4, 2010

(54) WEB-BASED SYSTEM AND METHOD FOR ELECTRONIC DATA DELIVERY

(75) Inventors: Matthew Brown, Cedar Park, TX (US); Bruce Fogelsong, Georgetown, TX (US); Juan Alvarado, Missouri City, TX (US); Mikhail Iakimov, Austin, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 737 days.

(21) Appl. No.: 10/298,253

(22) Filed: Nov. 15, 2002

(65) Prior Publication Data
US 2004/0098452 A1 May 20, 2004

(51) Int. Cl.
G06F 15/16 (2006.01)
(52) U.S. Cl. ...................................... 709/203; 709/232
(58) Field of Classification Search ................. 709/226, 709/231, 234, 203, 232
See application file for complete search history.

(56) References Cited

U.S. PATENT DOCUMENTS

| 5,619,647 | A | * | 4/1997 | Jardine ....................... 709/240 |
| 5,629,928 | A | * | 5/1997 | Calvignac et al. ........... 370/237 |
| 5,802,306 | A | * | 9/1998 | Hunt ........................... 709/228 |
| 5,805,823 | A | * | 9/1998 | Seitz .......................... 709/236 |
| 6,061,504 | A | | 5/2000 | Tzelnic et al. |
| 6,108,701 | A | * | 8/2000 | Davies et al. ................ 709/224 |
| 6,173,327 | B1 | * | 1/2001 | De Borst et al. ............ 709/231 |
| 6,452,924 | B1 | | 9/2002 | Golden et al. |
| 6,469,991 | B1 | | 10/2002 | Chuah |
| 6,483,846 | B1 | | 11/2002 | Huang et al. |

\* cited by examiner

*Primary Examiner*—Kenny S Lin
*Assistant Examiner*—Julian Chang
(74) *Attorney, Agent, or Firm*—Darla P. Fonseca; Jaime Castano

(57) ABSTRACT

A method for transmitting a plurality of data streams between a client and a server when the number of said data streams exceeds a number of accessible physical connections between the client and the server. The method includes steps for associating each of the data streams with a corresponding transaction handler; creating transactions for each of the data streams in response to receiving a request from the corresponding transaction handler to transmit its corresponding data stream; and responsive to determining that one of the physical connections to the server is accessible, transmitting each transaction over the available connection so that transactions from each of the data streams are transmitted in a near real time manner.

28 Claims, 4 Drawing Sheets

WEB-BASED SYSTEM AND METHOD FOR ELECTRONIC DATA DELIVERY

BACKGROUND

1. Field of the Present Invention

The present invention generally relates to the field of data delivery over the Internet and more particularly to a web-based system and method for the improved electronic delivery of multiple data streams over the Internet.

2. History of Related Art

The Internet, also referred to as a global computer network or network of computer networks, generally includes computers connected through a set of communication protocols known as Transmission Control Protocol/Internet Protocol ("TCP/IP"). One popular component of the Internet is the World Wide Web ("WWW" or the "web"), which is a collection of resources on servers on the Internet that utilize an application protocol known as the Hypertext Transfer Protocol ("HTTP") for controlling access to those resources.

Like many network protocols, HTTP uses a client-server model. An HTTP client, such as a remote user, opens a connection and sends a request message to an HTTP server, such as a web server, which then returns a response message to the client. The requests for resources generally involve either a request for transmission of data from the server to the client or the transmission of data from the client to the server.

With the significant increases in Internet usage and the corresponding increased loads being placed on servers to respond to requests for resources from a large number of clients concurrently, protocols have been generally implemented to limit the number of simultaneous connections that a server will permit a single client to make with the server during a particular access session. While some of these protocols implement a mandatory limitation, others implement a voluntary limitation.

For example, internet service application like the current MICROSOFT WINDOWS Internet Services ("WinInet") (MICROSOFT, WINDOWS and WinInet are trademarks of MICROSOFT CORPORATION) application limits the number of connections that may be made to HTTP servers to four simultaneous connections for an HTTP 1.0 server and two simultaneous connections for an HTTP 1.1 server. The current HTTP 1.1 specification mandates the two connection limit. The four connection limit for HTTP 1.0, on the other hand, is currently an industry self-imposed limitation which (at or near the time it was implemented) coincided with the standard used by a number of popular web browsers. Information on the HTTP 1.1 specification can be found in Request for Comment 2068 (RFC 2068) published by the Internet Working Group of the Internet Engineering Task Force, and which is incorporated herein by reference.

While these limitations are intended to reduce the congestion in gaining access to a server, they also have the negative side effect of limiting the ability of a client to communicate with a particular server. This limitation has significant impact in those instances where the need exists for a client to transfer large amounts of data from multiple data streams to a particular server in a real-time manner. The traditional solution consists of processing and transmitting each data stream in a linear order. That is, once assigned to an available physical connection to the server, the applicable data continues to maintain that connection (to the exclusion of the other data streams) until all data from the applicable data stream is transmitted. The result is that data from multiple data streams is transmitted in a linear, queued fashion, rather than in a real-time or near real-time manner.

It would be beneficial to implement a system and method for the efficient transmission of data from multiple data streams to a server in a real-time or near real-time manner.

BRIEF DESCRIPTION OF THE DRAWINGS

Objects and advantages of the invention will become apparent upon reading the following detailed description and upon reference to the accompanying drawings in which.

Figure 1:
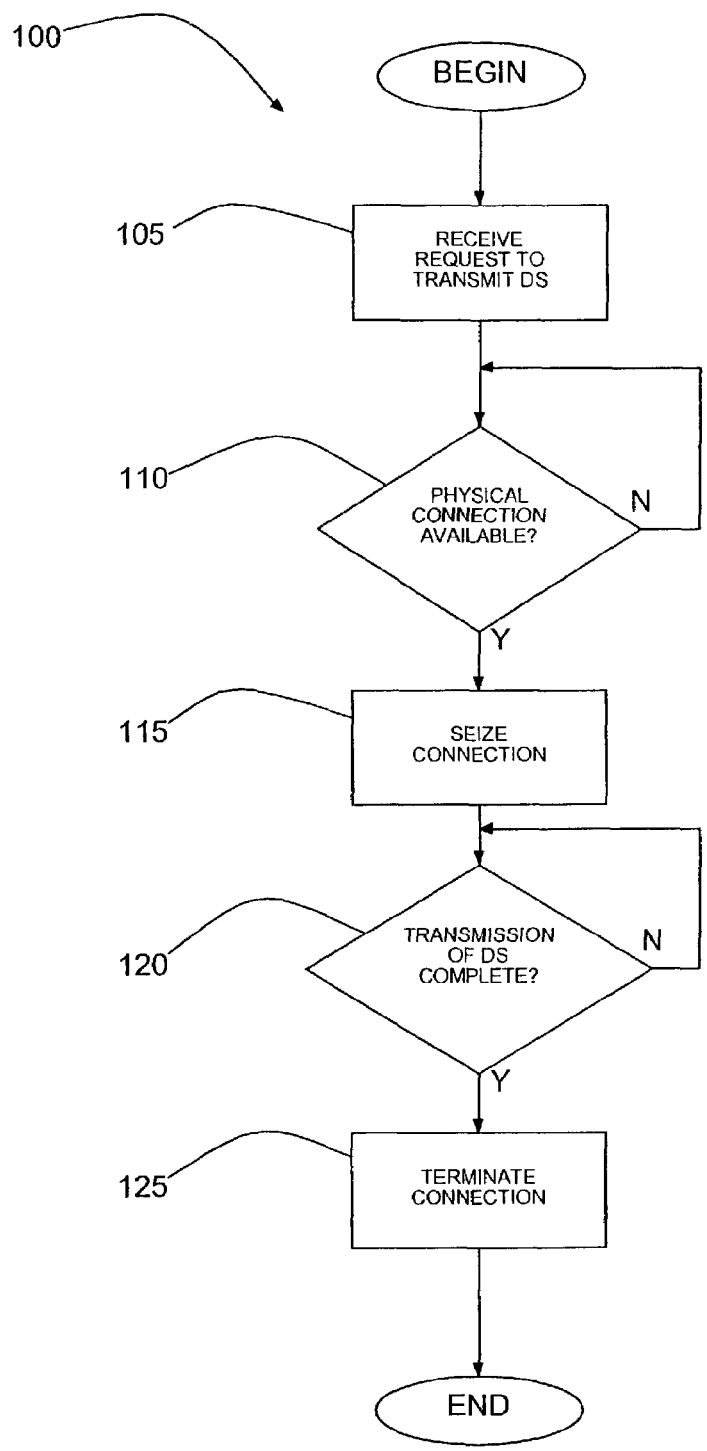
FIG. 1 is a flow diagram illustrating the manner in which data streams are transmitted from a client to a server according to the prior art.

While the invention is susceptible to various modifications and alternative forms, specific embodiments thereof are shown by way of example in the drawings and will herein be described in detail. It should be understood, however, that the drawings and detailed description presented herein are not intended to limit the invention to the particular embodiment disclosed, but on the contrary, the invention is limited only by the language of the appended claims.

DETAILED DESCRIPTION OF THE INVENTION

Generally speaking the present invention contemplates a method for the improved electronic delivery of multiple data streams between a client and a server over the Internet when the number of data streams exceeds the number of available physical connections between the client and the server. Throughout the description and the drawings, elements which are the same will be accorded the same reference numerals.

FIG. 1 depicts a flow diagram illustrating the method 100 by which data streams are transferred from a client to a server according to the prior art. As used herein the term "data stream" is to be broadly read as encompassing any file or compilation of data, including serialized byte streams. Method 100 generally involves processing each data stream in a linear order. The result is that once a data stream is assigned to a particular physical connection to the server, the physical connection is maintained by that data stream until all data from the data stream is transmitted or the process is otherwise halted by the system (e.g., an error occurs in the data or the transmission process or an external factor impacts the transmission).

Upon receiving a request to transmit a data stream (block 110), a determination is made as to whether a physical connection exists (block 115). If a physical connection is not available, generally a request will be made to the system for a physical connection and the process for transmitting the data stream will remain idle until the physical connection becomes available. Once available, the physical connection is seized and maintained for the duration of the transmission process associated with the particular data stream (block 120). Upon completion of the transmission (i.e., the entire data stream was successfully transmitted or an error or other external factor occurred halting the transmission), the physical connection is terminated so as to permit the connection to be utilized by other waiting data streams (block 125).

As previously noted, method 100 of the prior art generally involves processing each data stream in a linear order. Thus, assuming a logical limitation of two physical connections between a particular client and a particular server, the transmission of four data streams in accordance with method 100 of the prior art would result in two of the data streams waiting to transmit until the transmission process had successfully completed or otherwise terminated for at least one of the first two data streams. In many instances where numerous (if not hundreds of) data streams (some or the majority of which are quite lengthy) must be transmitted and it is important that the data from each stream be reviewed contemporaneously, method 100 of the prior art does not provide an adequate solution.

Figure 2:
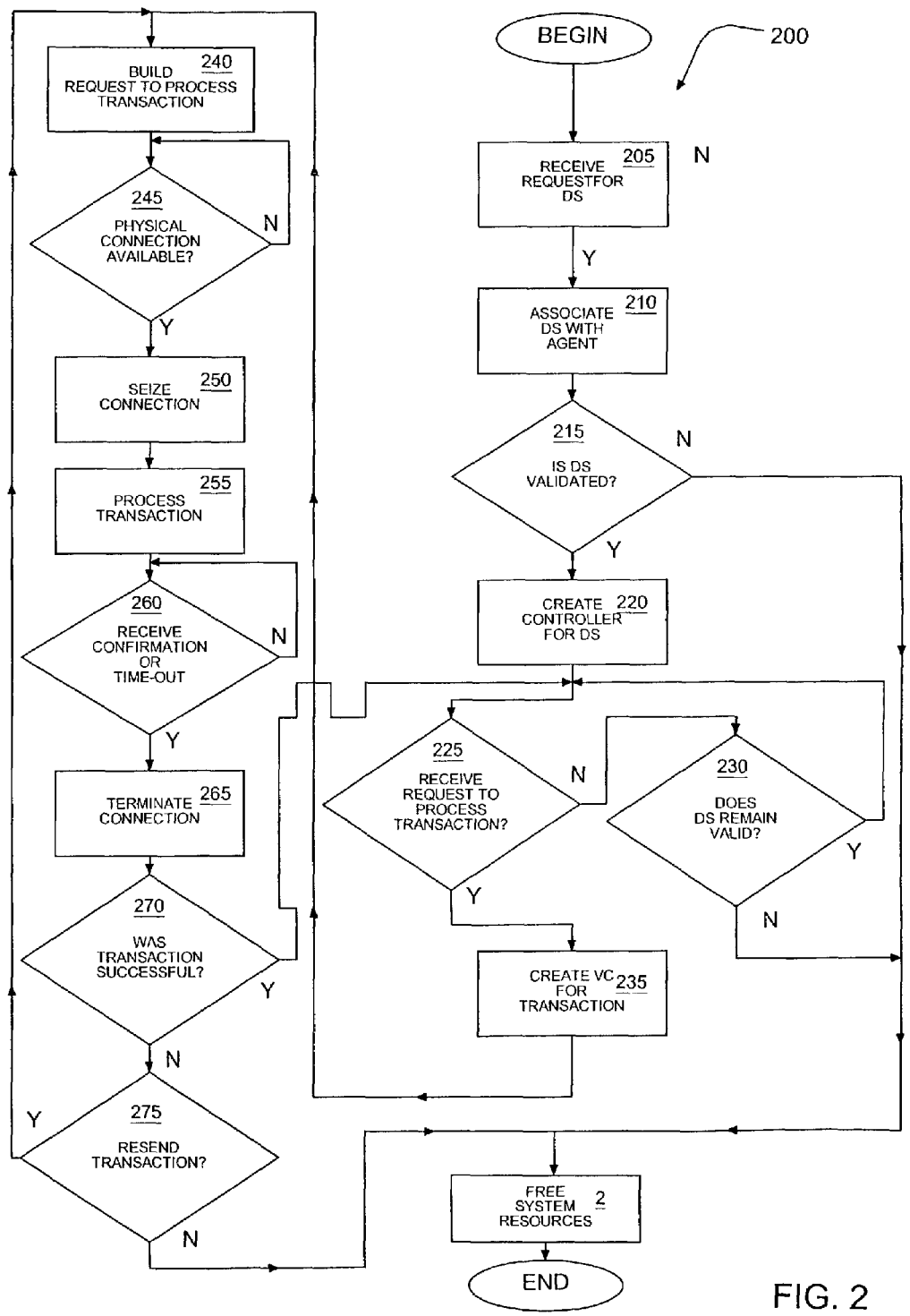
FIG. 2 is a flow diagram illustrating one aspect of the present invention.

FIG. 2 depicts a flow diagram illustrating an embodiment of a method 200 of the present invention. The embodiment generally involves associating each data stream with an agent and a corresponding controller and utilizing the agents and controllers to transmit portions of each data stream in an alternating manner. In the depicted embodiment, when a request is received for a data stream (block 205), the data stream corresponding to the request is associated with a unique agent (block 210). The data stream is validated (block 215) against pre-defined or user selectable fields and/or rules, and if successfully validated, a unique controller is created to handle the transmission particulars for the data stream (block 220). If the validation for the data stream fails, the agent and controller and applicable system resources created for the data stream are released and the transmission process associated with the data stream terminated (block 280).

In the depicted embodiment, if a request to process a transaction for the data stream is not received within a pre-defined (i.e., user defined, default system parameter, or the like) period, the controller will re-validate the data stream and continue to wait for a request to process a transaction for the data stream if the validation was successful (block 230). If the re-validation fails, applicable system resources created for the data stream are released and the transmission process associated with the data stream terminated (block 280).

Upon receiving a request from the agent to process a transaction associated with the data stream (block 225), the controller creates a virtual connection for use with the data stream (block 235). Each virtual connection permits the corresponding controller to establish the preliminary system and transmission parameters for its particular data stream prior to actually obtaining the physical connection so as to facilitate the processing of multiple data streams (the number of which would exceed the number of simultaneous physical connections available under the applicable protocol) while at the same time complying with the applicable protocol (which protocol limits the accessible number of physical connections). In the depicted embodiment, the virtual connection is maintained only for the duration of the transaction. In an alternative embodiment, the virtual connection is maintained for the duration of the entire data stream. While certain application program interfaces (such as WinInet) and systems implement and manage the limitation on the number of physical connections between a client and a particular server, other application program interfaces and systems do not. Thus, in a further embodiment, the virtual connection may (by way of flags or other global variables to monitor the number of physical connections concurrently in use for a particular server) also be employed to further implement and manage the limitation on the number of physical connections between the client and applicable servers in accordance with the applicable protocol.

The request to process the transaction is created by the controller (block 240) and a request for a physical connection to the server is made (block 245). In the present embodiment, block 240 includes determining the size of the transaction. Typically, such requests for resources such as the physical connection are made to the operating system with the controller remaining idle until granted the resource. Upon receiving access rights to a physical connection, the physical connection is seized (block 250) and the transaction is processed with the server utilizing the physical connection (block 255).

The physical connection is terminated upon either successful completion of the transaction or upon receipt of a system error or other external factor halting the transmission (e.g., transmission error, data corruption, or the like) (blocks 260 and 265). A determination is then made as to whether the transmission was successful (block 270). If the transaction was successful, the controller waits for another request from the agent to process another transaction for the data stream (block 225) whereupon the process is repeated for the additional transaction. If the transaction was not successful, a determination is made as to whether to re-send the transaction (block 275). If the determination is made not to re-send the transaction, applicable system resources created for the data stream are released and the transmission process associated with the data stream terminated (block 280). If, however, a determination is made to re-send the transaction, a request to process the transaction is re-created by the controller and the transmission process repeated. In one embodiment of the present invention, if the failure of the transaction transmission is due to the non-availability of the server or network (for example, a server or network crash), a recovery mode may be entered into wherein the transmission process is halted for a pre-defined or user selectable period and at the end of such period, a request to process the transaction is re-created by the controller and the transmission process repeated. The process is repeated until the data stream is fully transmitted or the transmission process for the data stream is otherwise halted.

Applicable statistical data regarding the transmission of the transaction is also maintained. Such statistical data may include the transaction size, length of time to transmit the transaction, cumulative transmission time for all transactions, and related information on the duration time of the data stream and each transaction making-up the data stream.

Unlike the prior art wherein the physical connection is maintained for the duration of the applicable data stream (i.e., until all data in the data stream is transmitted or the transmission is otherwise halted), it will be appreciated by those skilled in the art that the present embodiment enables the near real-time transmission of multiple data streams by selectively allocating portions of the data in each data stream into transactions, creating a virtual connection for each data stream or transaction, and voluntarily terminating the physical connection when the transaction has completed (which, in the majority of instances, will be prior to the complete transmission of the entire data stream). Thus, unlike the prior art in which data streams are transmitted in a linear fashion, portions of the data from all active data streams are transmitted in a staged or otherwise near real-time manner.

Assuming a logical limitation of two physical connections between a particular client and a particular server, the transmission of four data streams in accordance with method 200 would result in data from each of the data streams arriving at the server in an alternating, round-robin manner, rather than no data from the last two data streams arriving at the server until the transmission process for at least one of the first two data streams had terminated. Thus, in those instances where numerous (if not hundreds of) data streams (some or the majority of which are quite lengthy) must be transmitted and it is important that the data from each stream be reviewed contemporaneously, the embodiment of method 200 provides a solution.

Figure 3:
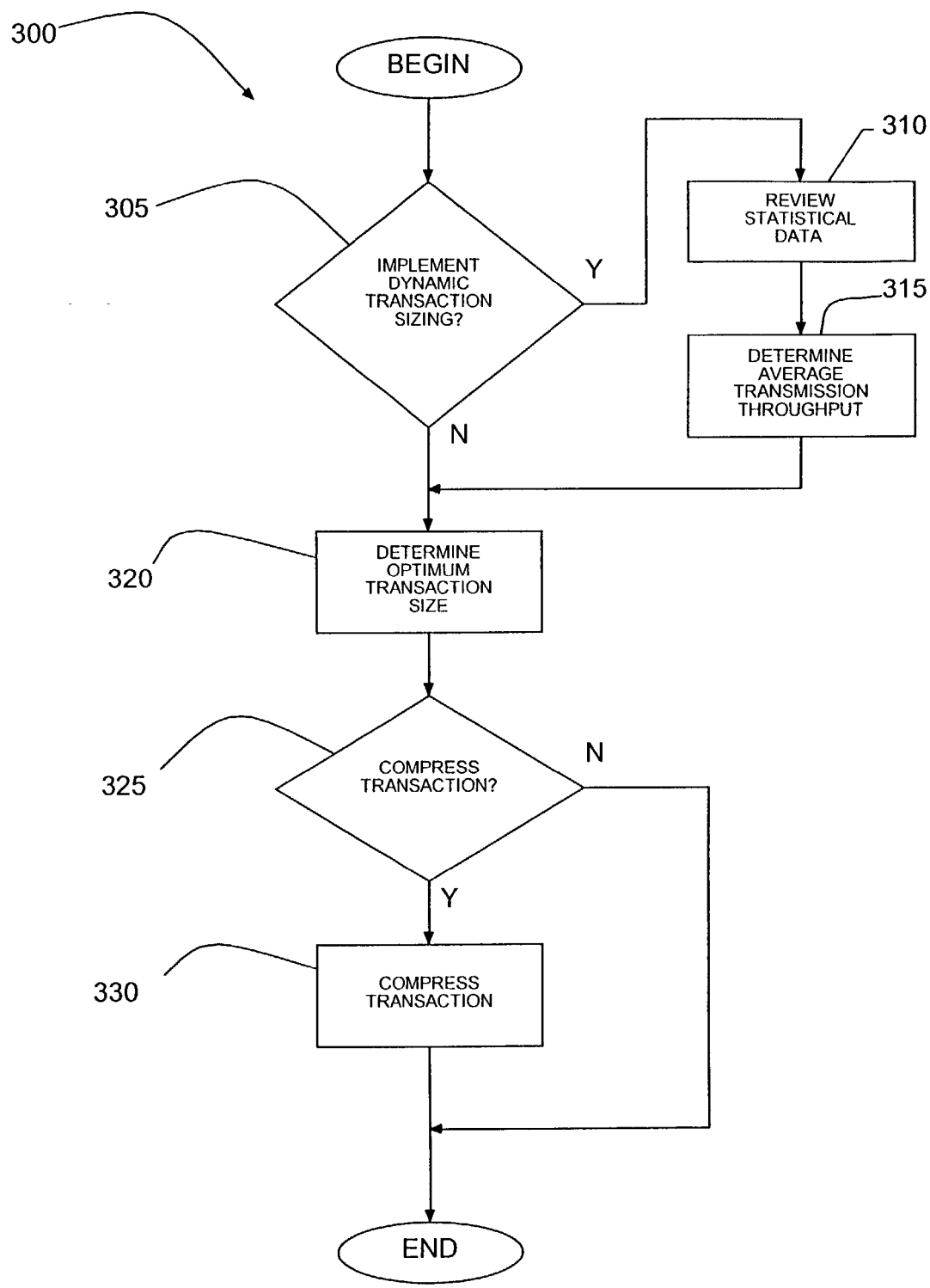
FIG. 3 is a flow diagram illustrating one embodiment for optimizing the size of each transaction to be transmitted as depicted in FIG. 2.

FIG. 3 depicts a flow diagram illustrating an embodiment of a method 300 for optimizing the size of the transaction when creating the request to process the transaction as depicted in block 240 of FIG. 2. If dynamic transaction sizing is implemented (block 305), then statistical data for previously transmitted transactions is reviewed (block 310). The statistical data may include the cumulative number of transactions, the cumulative size of the transactions, the cumulative transmission time, the average amount of time utilized for compression, the average compression ratio, and related information.

Using the statistical information, the average throughput (i.e., the amount of data moved successfully between the client and the server in a given time period) is determined (block 315) and then used to establish the transaction size (block 320). If dynamic transaction sizing is not implemented (block 305), then a pre-defined transaction size (i.e., user defined, default system parameter, or the like) is utilized for establishing the transaction size.

In one embodiment of the present invention utilizing dynamic transaction sizing, the average historical throughput for all active data streams is calculated and utilized to establish the size of each transaction. By way of example, if three data streams are being processed (data streams A, B, and C, respectively) and data stream A has a transaction size that has resulted in an average throughput of 10 Kbps (kilobits per second) during the relevant sampling period, data stream B has a somewhat larger transaction size that has resulted in an average throughput of 20 Kbps during the relevant sampling period, and data stream C has an even larger transaction size that has resulted in an average throughput of 30 Kbps during the relevant sampling period, then the average throughput for the three data streams is 20 Kbps. Using this average throughput, the size of each transaction for all data streams may be adjusted accordingly. Thus, so as to cause a more balanced transmission process for all active data streams, the size of each transaction for data stream A may be increased from 10 Kbps to 20 Kbps, the size of each transaction for data stream B may remain unchanged, and the size of each transaction for data stream C may be reduced from 30 Kbps to 20 Kbps.

Continuing with FIG. 3, a determination is also made as to whether to compress the transaction (block 325). In one embodiment of the present invention, the default setting is to compress each transaction. In an alternative embodiment, this default setting may be user selectable or otherwise changed based on then current system parameters. If compression of the transaction is to be employed, then the transaction is compressed and applicable compression information is included in the transaction utilizing currently available compression techniques (block 330). In one embodiment of the invention, statistics are maintained relating to the resulting compression ratio (i.e., percentage reduction in overall transaction size), the time taken to effect the compression, and the time taken to transmit the compressed transaction. Based on these statistics together with additional information such as available and projected throughput, the embodiment may then determine if the time necessary to compress each transaction results in a worthwhile reduction in overall transmission time, and using such information, the embodiment may update the compression "off/on" setting accordingly.

Figure 4:
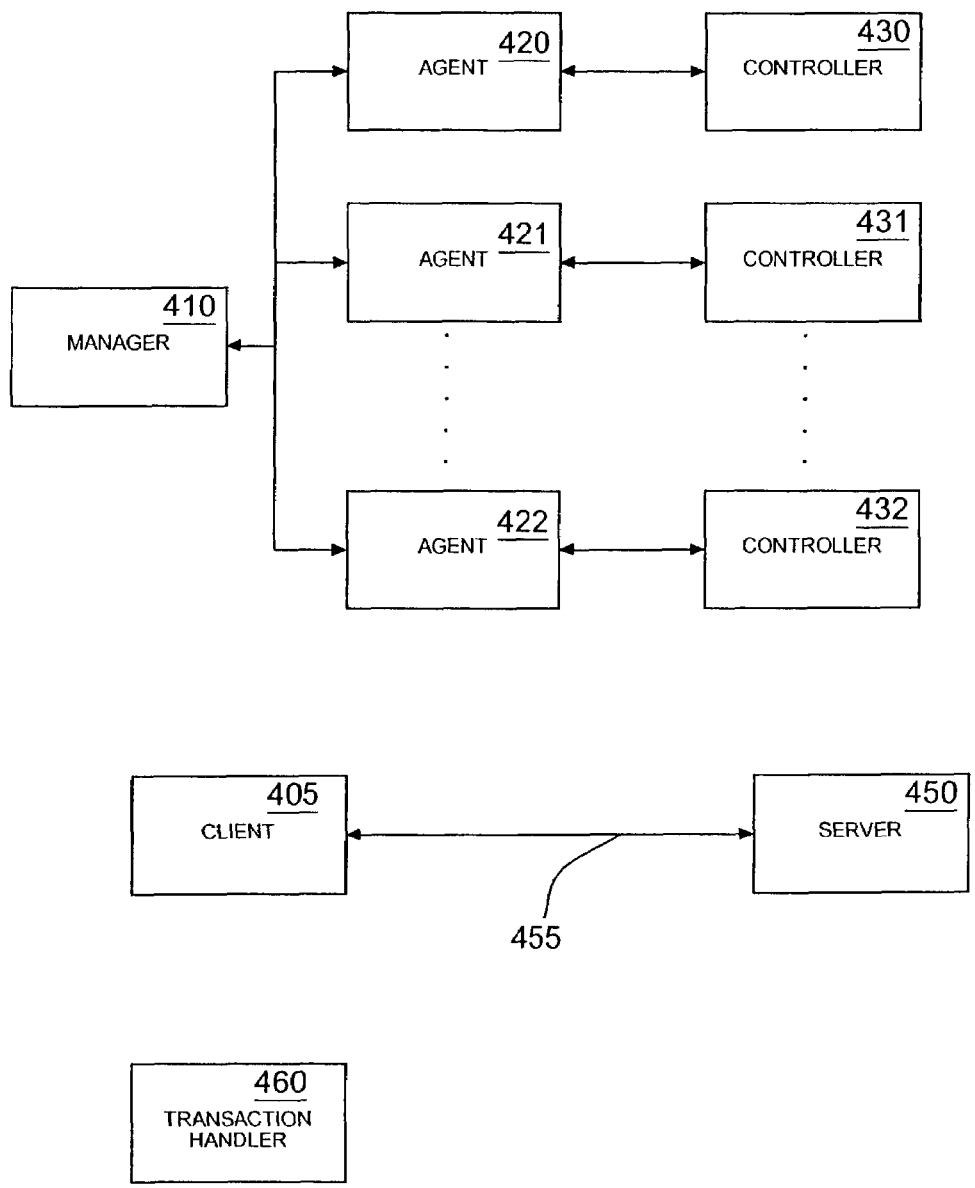
FIG. 4 conceptually depicts one embodiment of the manager, agent, and controller components of the present invention.

FIG. 4 conceptually depicts one embodiment of the manager, agent, and controller components of the present invention. Manager 410 and each of agents 420, 421, and 422 and each of controllers 430, 431, and 432 reside on client 405. Client 405 and server 450 communicate with one another via Internet connection 455.

In one embodiment of the present invention, manager 410, agents 420-422, and controllers 430-432 facilitate implementation of methods 200 and 300. Manager 410 is responsible for interfacing with the client and serves to provide the mechanism for data stream transfer invocation, control, and communication. In a preferred embodiment, manager 410 handles threading and synchronization issues for data stream transfers, monitors overall throughput and available bandwidth, maintains statistical information for each transfer, and configures and controls all transmissions. Agents 420-422 are responsible for overseeing and optimizing the transmission of their respective data streams. While agents 420-422 may be controlled directly by an end-user, in a preferred embodiment interaction with agents 420-422 is accomplished by way of manager 410. Controllers 430-432 are responsible for the actual transmission of their respective data streams.

Returning now to FIG. 2, upon receiving the first request for a data stream (block 205), manager 410 creates agent 420 and associates the data stream corresponding to the request with agent 420 (block 210). Subsequent requests for additional data streams are handled by manager 420 in a similar manner so that additional agents are created and associated with the applicable data streams; with the end result being a one-to-one correspondence between data stream and agent. Thus, if requests for two additional data streams were presented to manager 410, agents 421 and 422 would be created and associated, respectively, with the additional data streams.

Upon being associated with a data stream, the applicable agent validates the data stream (block 215). Thus, agent 220 would validate the first data stream (block 215). If the validation for the data stream fails, agent 420 and applicable system resources are released, manager 410 is updated, and the transmission process associated with the data stream terminated (block 280). If the data stream is successfully validated by agent 420, controller 430 is created to handle the transmission particulars for the data stream associated with agent 420 (block 220). Validations of additional data streams and creation of controllers to process each data stream are accomplished in a similar manner so that a one-to-one correspondence exists between agent and controller.

While only three agents and controllers are depicted in FIG. 3, it should be appreciated that any number of agents and corresponding controllers may be created and that such creation depends only on the number of data streams and system resources available. Thus, in the depicted embodiment, each data stream has a separate agent and a separate controller assigned to the data stream for the life of the data stream. In an alternative embodiment, controllers are not created for each agent and the agent is responsible for processing the transmission of its applicable data stream.

Continuing with agent 420, if agent 420 does not issue a request to controller 430 to process a transaction for the data stream within a pre-defined period, controller 430 will re-validate the data stream and continue to wait for a request to process a transaction for the data stream if the validation was successful (block 230). If the re-validation fails, agent 420 and controller 430 together with applicable system resources created for the data stream are released and the transmission process associated with the data stream terminated (block 280). In one embodiment, the agent is responsible for notifying its corresponding controller if the data stream is no longer valid.

Upon receiving a request from agent 420 to process a transaction associated with the data stream (block 225), controller 430 creates a virtual connection for use with the data stream (block 235). The request to process the transaction is created by controller 430 (block 240) and a request for a physical connection to the server is made by controller 430 (block 245). Upon receiving access rights to a physical connection, controller 430 seizes the physical connection (block 250) and processes the transaction with server 450 utilizing the physical connection (block 255) over Internet connection 455.

Controller 430 terminates the physical connection upon either successful completion of the transaction or upon receipt of a system error or other external factor halting the transmission (blocks 260 and 265). Controller 430 determines if the transmission was successful (block 270). If the transaction was successful, controller 430 then waits for another request from its corresponding agent 420 to process a transaction for the data stream (block 225) whereupon the process is repeated until all data in the data stream is transmitted or the transmission is otherwise halted. If the transaction was not successful, controller 430 determines whether to re-send the transaction (block 275). If the determination is made not to re-send the transaction, agent 420 and controller 430 together with applicable system resources created for the data stream are released and the transmission process associated with the data stream terminated (block 280). In an alternative embodiment, agent 420 directs controller 430 on whether to re-send the transaction.

If, however, a determination is made to re-send the transaction, a request to handle the transaction is re-created by controller 430 and the transmission process repeated. Applicable statistical data regarding the transmission of the transaction is maintained and reported to agent 420 and manager 410. Such statistical data may include the transaction size, length of time to transmit the transaction, cumulative transmission time for all transactions, and related information on the duration time of the data stream and each transaction making-up the data stream. While each applicable agent will have statistical information on the transactions processed by the applicable agent's controller so as to permit the agent to dynamically adjust the transaction size for its corresponding data stream, the manager will have statistical information for all data streams. Maintenance by manager 410 of all such statistical information permits manager 410 to determine average transmission throughput for all active data streams (block 315) so as to permit manager 410 to instruct the agents 420-422 to dynamically adjust the transaction size globally (i.e., the same transaction size across all active data streams).

While the embodiment discussed above includes manager 410, agents 420-422, and controllers 430-432, an alternative embodiment includes transaction handler 460 which resides on client 405 and which transaction hander 460 may accomplish all or a portion of the tasks accomplished by manager 410, agents 420-422, and controllers 430-432.

It should be appreciated that portions of the present invention may be implemented as a set of computer executable instructions (software) stored on or contained in a computer-readable medium. The computer readable medium may include a non-volatile medium such as a floppy diskette, hard disk, flash memory card, ROM, CD ROM, DVD, magnetic tape, or another suitable medium. Source code for an alternative embodiment of the invention is included in Appendix A to this disclosure.

It will be apparent to those skilled in the art having the benefit of this disclosure that the present invention contemplates a method for the improved electronic delivery of multiple data streams over the Internet. It is understood that the forms of the invention shown and described in the detailed description and the drawings are to be taken merely as presently preferred examples and that the invention is limited only by the language of the claims.

What is claimed is:

1. A method for transmitting a plurality of data streams from a client to server when the number of said data streams exceeds a number of accessible physical connections between the client and the server, comprising:
   a) associating each of the data streams with a corresponding transaction handler residing on the client;
   b) responsive to receiving a request from a transaction handler to transmit its corresponding data stream, creating a transaction for the data stream; wherein the transaction comprises at least a portion of the data stream; and
   c) responsive to determining that one of the physical connections to the server is accessible, transmitting the transaction over the available connection;

wherein the transaction handler, upon receiving said request to transmit said data stream, generating an agent for validating said request to process the transaction associated with said data stream and, upon a successful validation of said request; generating a controller for creating a virtual connection used for establishing preliminary parameters of the data stream prior to said transmitting of the transaction over the available physical connection, and upon a failed validation of said request the controller and virtual connection are not generated thereby releasing system resources, and wherein the method for transmitting a plurality of data streams between the client and the server further comprises utilizing the transaction handler to transmit portions of each data stream in an alternating manner so that the portions of each data stream are transmitted in a staged or near real-time manner between the client and the server.

2. The method of claim 1 further comprising:
   d) responsive to determining completion of the transmission, terminating the physical connection.

3. The method of claim 2 wherein each of the steps b), c), and d) are performed until all of the transactions for all of the data streams are transmitted.

4. The method of claim 3 wherein each of the transaction handlers maintain statistical data on the transmission for each of the transactions.

5. The method of claim 1 further comprising:
   e) validating the data stream prior to transmitting the transaction.

6. The method of claim 1 further comprising:
   f) optimizing the size of the transaction prior to transmitting the transaction.

7. The method of claim 1 wherein each of the transaction handlers comprises an agent.

8. The method of claim 1 further comprising:
   g) creating a virtual connection for each of the transactions.

9. The method of claim 8 wherein the virtual connection establishes transmission parameters for each of the transactions.

10. The method of claim 8 wherein the virtual connection implements the limitation on the number of physical connections between the client and the server in accordance with a physical connection protocol.

11. The method of claim 1 further comprising:
    h) creating a virtual connection for each of the data streams.

12. The method of claim 11 wherein the virtual connection establishes transmission parameters for each of the data streams.

13. The method of claim 11 wherein the virtual connection implements the limitation on the number of physical connections between the client and the server in accordance with a physical connection protocol.

14. The method of claim 1 further comprising:
   i) associating a controller with each of the transaction handlers; wherein the controller transmits the transaction.

15. The method of claim 1 further comprising:
   j) a manager; wherein the manager manages the transmission of each data stream.

16. A computer-readable medium tangibly having a program of machine-readable instructions for causing a processor to perform a method for transmitting a plurality of data streams from a client to a server when the number of said data streams exceeds a number of accessible physical connections between the client and the server, comprising:
   a) associating each of the data streams with a corresponding transaction handler residing on the client;
   b) responsive to receiving a request from a transaction handler to transmit its corresponding data stream, creating a transaction for the data stream; wherein the transaction comprises at least a portion of the data stream; and
   c) responsive to determining that one of the physical connections to the server is accessible, transmitting the transaction over the available connection;
wherein the transaction handler, upon receiving said request to transmit said data stream, generating an agent for validating said request to process the transaction associated with said data stream and, upon a successful validation of said request generating a controller for creating a virtual connection used for establishing preliminary parameters of the data stream prior to said transmitting of the transaction over the available physical connection, and upon a failed validation of said request the controller and virtual connection are not generated thereby releasing system resources, and wherein the method for transmitting a plurality of data streams between the client and the server further comprises utilizing the transaction handler to transmit portions of each data stream in an alternating manner so that the portions of each data stream are transmitted in a staged or near real-time manner between the client and the server.

17. The computer-readable medium of claim 16 further having instructions for causing a processor to perform a method, the method further comprising:
   d) responsive to determining completion of the transmission, terminating the physical connection.

18. The computer-readable medium of claim 17 further having instructions for causing a processor to perform each of the steps b), c), and d) until all of the transactions for all of the data streams are transmitted.

19. The computer-readable medium of claim 18 further having instructions for causing a processor to maintain statistical data on the transmission for each of the transactions.

20. The computer-readable medium of claim 16 further having instructions for causing processor to perform a method, the method further comprising:
   e) validating the data stream prior to transmitting the transaction.

21. The computer-readable medium of claim 16 further having instructions for causing a processor to perform a method, the method further comprising:
   f) optimizing the size of the transaction prior to transmitting the transaction.

22. The computer-readable medium of claim 16 further having instructions for causing a processor to perform a method, the method further comprising:
   g) creating a virtual connection for each of the transactions.

23. The computer-readable medium of claim 22 further having instructions for causing a processor to establish transmission parameters for each of the transactions.

24. The computer-readable medium of claim 22 further having instructions for causing a processor to implement the limitation on the number of physical connections between the client and the server in accordance with a physical connection protocol.

25. The computer-readable medium of claim 16 further having instructions for causing a processor to perform a method, the method further comprising:
   h) creating a virtual connection for each of the data streams.

26. The computer-readable medium of claim 25 further having instructions for causing a processor to establish transmission parameters for each of the data streams.

27. The computer-readable medium of claim 25 further having instructions for causing a processor to implement the limitation on the number of physical connections between the client and the server in accordance with a physical connection protocol.

28. The computer-readable medium of claim 16 further having instructions for causing a processor to perform a method, the method further comprising:
   i) associating a controller with each of the transaction handlers; wherein the controller transmits the transaction.

* * * * *